United States Patent [19]

Arnall et al.

[11] Patent Number: 4,736,796
[45] Date of Patent: Apr. 12, 1988

[54] TAMP HOLE PLUG SYSTEM AND METHOD

[76] Inventors: F. James Arnall, Box 12, Site 10, RR#1, Dewinton, Alberta T0L 0X0; Robert W. Graul, P.O. Box 445, Bragg Creek, Alberta T0L 0K0; Robert K. Spence, 729 52nd Ave. S.W., Calgary, Alberta T2V 0B6, all of Canada

[21] Appl. No.: 880,525

[22] Filed: Jun. 30, 1986

[51] Int. Cl.$^4$ .......................................... E21B 33/138
[52] U.S. Cl. ...................................... 166/292; 166/286; 102/333
[58] Field of Search ............... 166/292, 293, 285, 291, 166/286, 179, 192; 102/333

[56] References Cited

U.S. PATENT DOCUMENTS

| 625,380 | 5/1899 | Clark | 102/333 |
|---|---|---|---|
| 1,480,674 | 1/1919 | Diescher | 166/286 |
| 1,627,991 | 5/1927 | Owen | 102/333 X |
| 1,631,419 | 6/1927 | Kinley | 166/286 X |
| 1,937,247 | 11/1933 | Ritter | 166/291 |
| 1,979,802 | 11/1934 | Kinley | 102/333 X |
| 2,075,882 | 4/1937 | Brantly | 166/291 X |
| 2,104,488 | 1/1938 | Kennedy et al. | 166/292 |
| 2,836,555 | 5/1958 | Armentrout | 166/292 X |
| 3,070,163 | 12/1962 | Colby et al. | 166/293 X |
| 3,208,525 | 9/1965 | Caldwell et al. | 166/286 X |
| 3,447,608 | 6/1969 | Fry et al. | 166/293 |
| 3,608,491 | 9/1971 | Botes | 102/333 |
| 4,463,808 | 8/1984 | Mason et al. | 166/292 |

FOREIGN PATENT DOCUMENTS 899715  5/1972  Canada ............................. 102/333

Primary Examiner—Stephen J. Novosad
Attorney, Agent, or Firm—Harold H. Dutton, Jr.; George H. Dunsmuir

[57] ABSTRACT

Shallow boreholes, e.g. seismic shot holes are usually sealed with cement, gravel or more recently by pouring a water swellable material such as bentonite into the hole. A more effective method of sealing involves the insertion of an impermeable bottom plug into the hole, followed by a thick layer of a particulate material such as sodium bentonite which expands when in contact with water to seal the hole. A top plug can also be used with or without a cover of cuttings to promote lateral expansion of the sealant in the hole.

13 Claims, 2 Drawing Sheets

TAMP HOLE PLUG SYSTEM AND METHOD

BACKGROUND OF THE INVENTION

This invention relates to a borehole seal, and in particular to a water activated seal.

During seismic exploration, a plurality of holes are drilled into the ground. Often the hole will flow, i.e. water will flow or seep to the surface. By law, such flowing holes must be stopped or plugged. At present, the holes are plugged by means of a device including a rubber bladder. When the device is placed in a hole and inflated using compressed air, a plug is formed. The hole is then filled with concrete to create a permanent plug. The principal disadvantage of such a system is that a specialized contractor must be employed to install the plug which can be quite expensive.

Hole seals or plugs are also required for shot holes, i.e. holes containing explosive charges used for seismic exploration. It should be possible to seal a seismic hole quickly; otherwise, exploration time may be unduly lengthy.

Applicant's Canadian patent application Ser. No. 453,879, filed May 9, 1984 describes a liquid activated seal or plug which is particularly designed for so-called flowing holes, i.e. holes containing water.

The object of the present invention is to provide an even more simple seal and hole sealing method which is particularly suitable for use in shallow boreholes such as seismic shot holes.

SUMMARY OF THE INVENTION

Accordingly, the present invention relates to a water-activated borehole seal comprising impermeable bottom plug means for insertion into the borehole; and water expansible, particulate sealant material for covering said bottom plug means, whereby said bottom plug means can be placed in a borehole and covered with said sealant material to a height above the bottom plug means sufficient to form a tight seal when the material is water activated.

The invention also relates to a borehole seal including impermeable top plug means for insertion into the borehole on the sealant material to promote lateral expansion of said sealant material when in contact with water.

BRIEF DESCRIPTION OF THE DRAWINGS

The invention will now be described in greater detail with reference to the accompanying drawings, which illustrate a preferred embodiment of the invention, and wherein.

DESCRIPTION OF THE PREFERRED EMBODIMENT(S)

Figure 1:
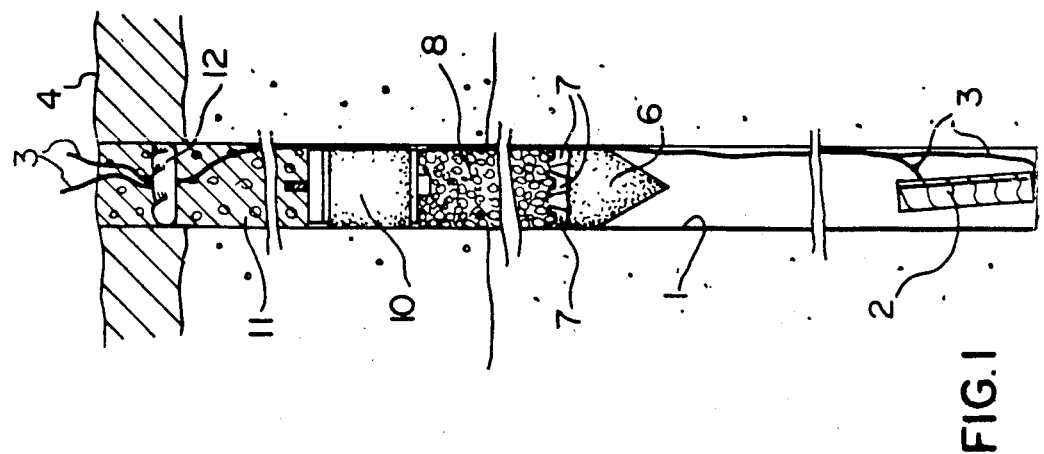
FIG. 1 is a schematic, longitudinal sectional view of a borehole containing a hole seal in accordance with the present invention.

With reference to FIG. 1, the seal of the present invention is primarily intended for use in a shallow, e.g. twenty-five feet deep, seismic borehole 1 containing an explosive charge 2 in the bottom thereof, with electrical leads 3 extending to the surface 4.

In order to seal the hole 1, a water-tight, conical plug 6 is inserted into the hole to the desired depth, e.g. one half the distance to the bottom. The plug 6 is formed of rubber or another flexible material, and includes flexible, flaring wings 7 for engaging the walls of the hole 1. Several feet of liquid expansible, particulate sealant material 8 is placed in the hole 1 on the plug 6. Water is added to the material 8, so that, after several hours, the material will expand to plug the hole 1. A tamp plug 10 is placed in the hole 1 and the material 8 is compacted using a tamp pole (not shown). The hole 1 is filled to the surface 4 with hole cuttings 11, and sealed with a surface hole plug 12. During expansion of the sealant material 8, the plugs 6 and 10, and the cuttings 11 prevent vertical swelling of the material 8. Lateral expansion of such material causes sealing of the top end of the hole 1.

Figure 2:
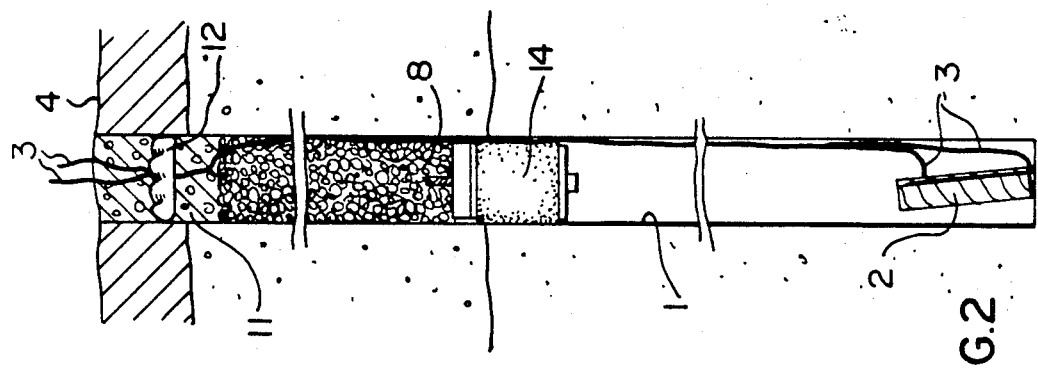
FIG. 2 is a schematic, longitudinal sectional view of a borehole containing a second embodiment of the hole seal of the present invention.

In a second embodiment of the invention (FIG. 2), the conical bottom plug 6 is replaced with a tamp plug 14 similar to the top plug 10 of the seal of FIG. 1, the hole above plug 14 is filled with sealant material 8 and cuttings 11, and sealed with a surface plug 12. This form of the invention is intended for short seals near the top end of the hole 1. The plugs 12 and 14, and the cuttings 11 inhibit vertical expansion of the material 8 during sealing of the hole 1.

Figure 3:
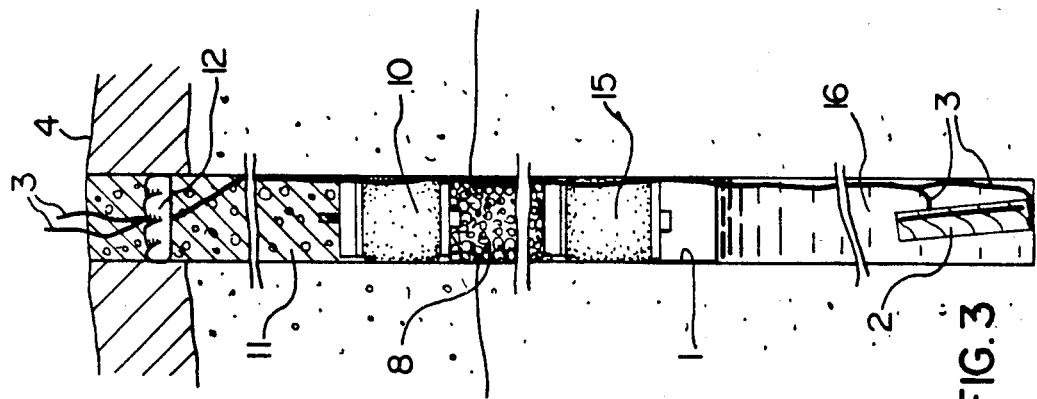
FIG. 3 is a schematic, longitudinal sectional view of a borehole containing a third embodiment of the hole seal of the present invention.

With reference to FIG. 3, the third embodiment is similar to the first embodiment of the invention, except that the bottom plug 6 is replaced by a second tamp plug 15. The seal is used in a hole 1 containing water 16.

Figure 4:
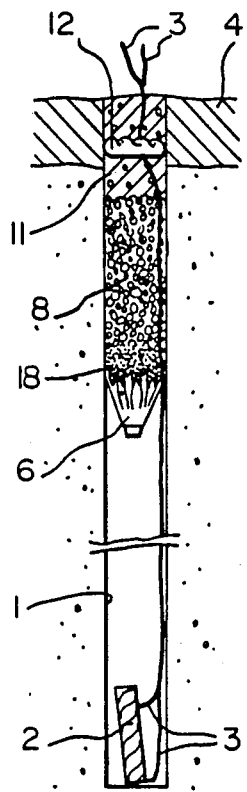
FIG. 4 is a schematic longitudinal sectional view of a borehole showing another embodiment of the invention.
Figure 5:
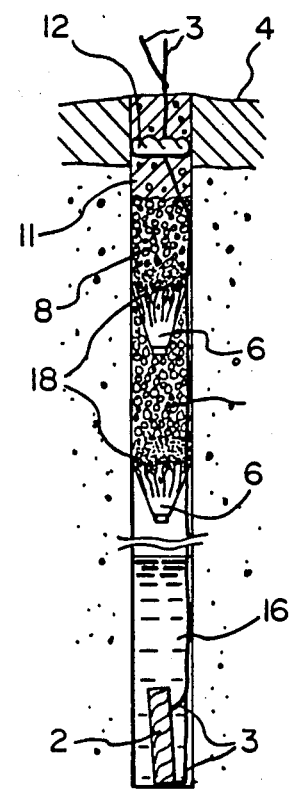
FIG. 5 is a schematic, longitudinal sectional view of a borehole containing a fifth embodiment of the hole seal of the presen invention.

With reference to FIGS. 4 and 5, the fourth and fifth embodiments of the invention are similar to the second and third embodiments (FIG. 2), except that the sealant material 8 includes a bottom layer 18 of finer particles which swell more quickly than the upper mass of larger particles, thus providing a relatively quick seal above the plug 6.

When using the embodiment of FIG. 4, after the charge 2 and leads 3 have been placed in the hole 1, the plug 6 is inserted into the hole and covered with the smaller particulate sealant material 18. A small quantity of water (e.g. 2 gal) is poured into the hole and after a wait of two minutes a loading pole is lowered to the top of the plug to determine whether the plug 6 is holding the water. Once it is established that the plug is holding the water. Once it is established that the plug is holding the water, the larger size particulate material is placed in the hole 1 and a larger quantity of water (e.g. 3 gal) is added. The hole 1 is then filled to approximately eighteen inches below grade with compacted cuttings or gravel 11, a hole plug 12 is inserted and the hole is filled to grade with cuttings or gravel.

When using the seal of FIG. 5, sufficient cuttings are placed in the borehole 1 to cover the charge 2, and a plug 6 is inserted into the hole. The remainder of the method is the same as for the fourth embodiment except that the steps of inserting sealant, water and sealant are performed before insertion of the second plug 6.

The system of FIG. 5 can be used in a flowing hole, i.e. a hole in which the water surface is at grade and moving from the hole. In such case, a first plug 7 is inserted into the hole 1 followed by a small quantity of finer particulate sealant 18, a larger quantity of coarser sealant 8, a second plug 6, finer sealant 18, coarser sealant 8, cuttings or gravel 11, a surface plug 12 and compacted cuttings or gravel to grade.

It will be appreciated that in its simplest form the seal includes a water-tight bottom plug 6, 14 or 15 and sealant material 8 without a top plug.

The preferred sealant material is sodium bentonite, which when unrestricted expands within hours to 10–15 times its original volume to form a flexible plug.

The embodiments of an invention in which an exclusive property of privilege is claimed are defined as follows:

1. A water-activated borehole seal comprising impermeable bottom plug means for insertion into the borehole; and water expansible, particulate sealant material for covering said bottom plug means, said sealant material including a first, bottom layer of fine particulate sealant material and a second, thicker upper layer of coarse particulate sealant material, whereby said bottom plug means can be placed in a borehole and covered with said sealant material to a height above the bottom plug means sufficient to form a tight seal when the material is water activated.

2. A borehole seal according to claim 1, including impermeable top plug means for insertion into the borehole on the sealant material to promote lateral expansion of said sealant material when in contact with water.

3. A borehole seal according to claim 2, wherein said bottom plug means is a tamp plug.

4. A borehole seal according to claim 3, wherein said top plug means is a tamp plug.

5. A borehole seal according to claim 2, wherein said top plug means is a tamp plug.

6. A water-activated borehole seal for a shallow, seismic charge borehole comprising bottom plug means for insertion into the borehole; water expansible, particulate sealant material for covering said bottom plug means; and top plug means for placing on said sealant material for receiving fill and a surface plug on the top thereof, whereby said bottom plug means can be placed in a borehole followed by said sealant material, said top plug means, fill and the surface plug to promote lateral expansion of said sealant material when the latter is water activated.

7. A method of sealing a borehole comprising the steps of placing a water impermeable bottom plug means in a borehole to form a bottom seal; covering said bottom plug means with a water expansible, particulate sealant material, thereafter compacting said sealant material and introducing water into said borehole and into contact with said particulate sealant material, whereby, the water enters said sealant material the material expands to seal the hole tightly.

8. A method according to claim 7, including the step of placing water impermeable top plug on said sealant material in the borehole to promote lateral expansion of said sealant material when water activtated.

9. A method according to claim 8, including the steps of covering said top plug means with borehole cuttings and a surface plug.

10. A method according to claim 9, including the steps of covering said bottom plug means with a first, bottom layer of fine particulate sealant material, followed by a second, top layer of coarse particulate sealant material.

11. A method according to claim 8, including the steps of covering said bottom plug means with a first, bottom layer of fine particulate sealant material, followed by a second, top layer of coarser particulate sealant, material.

12. A method according to claim 7, including steps of covering said sealant material with borehole cuttings and a surface plug.

13. A method according to claim 7, including the steps of covering said bottom plug means with a first, bottom layer of fine particulate sealant material, followed by a second, top layer of coarser particulate sealant material.

* * * * *